J. S. BARNETT.
COTTON CULTIVATOR.
APPLICATION FILED MAY 6, 1920.
1,378,513.
Patented May 17, 1921.
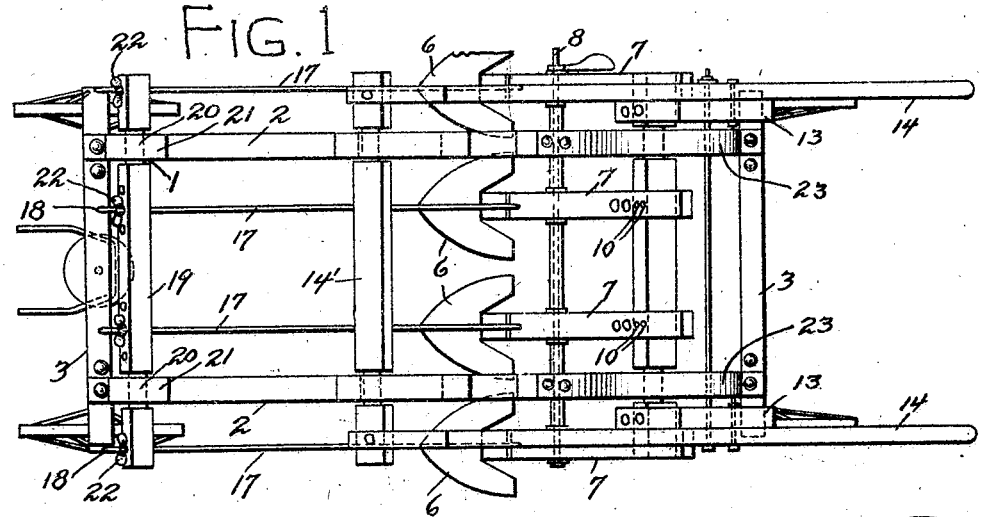
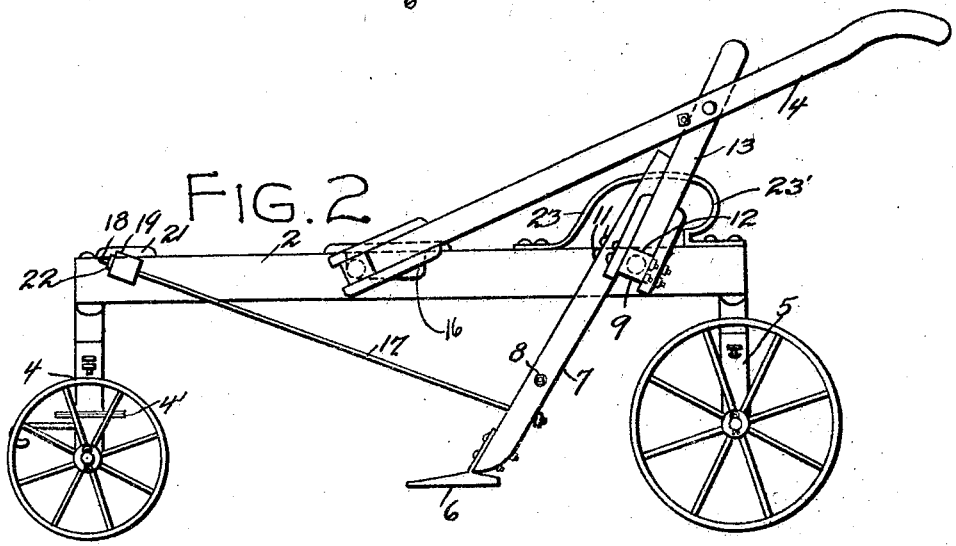
INVENTOR
James Samuell Barnett

UNITED STATES PATENT OFFICE.

JAMES SAMUEL BARNETT, OF DALLAS, TEXAS.

COTTON-CULTIVATOR.

1,378,513.                Specification of Letters Patent.        Patented May 17, 1921.

Application filed May 6, 1920. Serial No. 379,412.

*To all whom it may concern:*

Be it known that I, JAMES SAMUEL BARNETT, a citizen of the United States, residing at Dallas, in the county of Dallas and State of Texas, have made a new and useful Improvement in Cotton-Cultivators.

This invention relates to cotton cultivators and more particularly to an improvement on my Patent, No. 885,315, issued April 21, 1908.

The object of my invention is to provide an improved cultivator which may be readily handled when the plows are not in the ground.

A further object of my invention is to provide means for relieving the operator of the weight of the plow while the same is being turned.

The invention consists in the features and combination and arrangement of parts more fully herein shown and described.

In the drawing:

Figure 1 is a top plan view of a cotton chopper with my device applied.

Fig. 2 is a side elevation of Fig. 1.

Referring now to the drawing 1 is a main frame being composed of side bars 2 with cross bars 3 fixed rigidly thereto at the front and rear, the front bar being supported upon a front truck 4 which is swiveled at 4′ to the front bar, the rear being supported by a rigidly connected truck 5. The plows or implements 6 are carried by the lower ends of hangers 7, which are connected together near their lower ends by a cross bar 8, and which at their upper ends are connected to the stock beam 9, this connection being adjusted so that the tools may be set higher or lower in relation to the main frame. For this purpose a series of holes 10 are formed in the stocks to receive bolts 11. The stock beam 9, when in its lowermost position, rests in recesses 12 in beams 2, and said beam is connected to hangers 13 extending upwardly and joined to the handles 14. These handles extend rearwardly to provide a convenient grip to the operator and their front ends are connected to a cross bar 14′, which passes through slots or openings in the side bars 16. The stocks 7 are further connected with the front of the main frame by rods 17 passing through the said stocks and having heads thereon, these rods being threaded at 18 and passing through a front cross bar 19. This front cross bar is pivotally mounted in the main frame as at 20, the notch being covered by a plate 21. The screw threaded portion of the rod 17 receives wing nuts 22 and by turning these tools may be adjusted.

I provide on the longitudinal main bars of the frame a device 23 of substantially semi-circular shape, provided with a bent-in portion 23′ at the rear. The stock beam together with the stocks and tools may be raised by elevating the handles and by continuing this movement the beam strikes the top of bar 23 and the operator by continuing the elevating movement may raise the rear portion of the machine so that it may be readily turned around on the front truck.

The height of the stock beam may be so adjusted that when beam 9 is allowed to fall back into portion 23′, the plows will be entirely off the ground and the weight thereof will not be upon the operator. The advantage of this will be readily apparent, as, for instance, in my former device, in order to remove the cultivator from the field to the barn, it was necessary either to turn a furrow the entire distance or the operator was forced to bodily lift the weight of the stock and plows from the ground on the way to the barn.

Another advantage will be seen in that when beam 9 is elevated, its height of elevation is limited inasmuch as it is entirely confined by bar 23. This is an added advantage because were it possible to elevate beam 9 to an unlimited height, the entire assembly would become displaced and the stock beam distorted to a great extent.

What I claim is:

A device of the class described comprising a main frame mounted upon trucks, handle members mounted upon the frame, a stock beam and hanger supported from the handle members and a support for the stock beam mounted on the frame, said support being mounted transversely of said stock beam and positively limiting the upward movement of said beam beyond the top of said support.

In testimony whereof I affix my signature in the presence of two witnesses.

JAMES SAMUEL BARNETT.

Witnesses:
R. M. BARNETT,
C. E. PRATT.